United States Patent
Tenorio

(10) Patent No.: US 7,475,030 B1
(45) Date of Patent: Jan. 6, 2009

(54) FACILITATING ELECTRONIC COMMERCE TRANSACTIONS USING A SHARED PRODUCT DATA REPOSITORY

(75) Inventor: Manoel Tenorio, Mountain View, CA (US)

(73) Assignee: i2 Technologies US, Inc., Dallas, TX (US)

(*) Notice: Subject to any disclaimer, the term of this patent is extended or adjusted under 35 U.S.C. 154(b) by 686 days.

(21) Appl. No.: 09/859,266

(22) Filed: May 16, 2001

(51) Int. Cl.
*G06F 17/30* (2006.01)

(52) U.S. Cl. ............................. 705/27; 705/26; 707/10

(58) Field of Classification Search ............. 705/26–27; 707/10
See application file for complete search history.

(56) References Cited

U.S. PATENT DOCUMENTS

| | | | | |
|---|---|---|---|---|
| 3,961,164 A | | 6/1976 | Reed et al. ............... 235/61.12 |
| 4,992,940 A | * | 2/1991 | Dworkin ..................... 705/26 |
| 5,319,542 A | * | 6/1994 | King et al. ................... 705/27 |
| 5,347,632 A | | 9/1994 | Filepp et al. ................. 395/200 |
| 5,528,490 A | * | 6/1996 | Hill .......................... 717/168 |
| 5,551,027 A | | 8/1996 | Choy et al. ................... 395/600 |
| 5,564,043 A | | 10/1996 | Siefert ........................ 395/600 |
| 5,642,419 A | | 6/1997 | Rosen .......................... 380/23 |
| 5,694,546 A | | 12/1997 | Reisman .................... 395/200.9 |
| 5,721,832 A | | 2/1998 | Westrope et al. ............. 395/227 |
| 5,727,129 A | | 3/1998 | Barrett et al. ................ 395/12 |
| 5,777,608 A | | 7/1998 | Lipovksi et al. ............. 345/189 |
| 5,790,677 A | | 8/1998 | Fox et al. ..................... 380/24 |
| 5,870,473 A | | 2/1999 | Boesch et al. ................ 580/21 |
| 5,918,229 A | | 6/1999 | Davis et al. .................. 707/10 |
| 5,926,797 A | | 7/1999 | Goodwin, III ............... 705/20 |
| 5,935,207 A | | 8/1999 | Logue et al. ................ 709/219 |
| 5,963,134 A | | 10/1999 | Bowers et al. ........... 340/572.1 |
| 5,970,471 A | | 10/1999 | Hill ............................. 705/26 |
| 5,983,309 A | | 11/1999 | Atsatt et al. .................... 711/4 |
| 5,987,233 A | | 11/1999 | Humphrey ............. 395/200.47 |
| 5,991,115 A | | 11/1999 | Chainer et al. ................ 360/75 |

(Continued)

OTHER PUBLICATIONS

Girishankar, Saroja; "Build the E-Commerce Catalog," Information Week, Nov. 29, 1999, p. 74, Dialog file 13 #00677157, 5pgs.*

(Continued)

*Primary Examiner*—Robert M. Pond
(74) *Attorney, Agent, or Firm*—Steven J. Laureanti; Booth Udall, PLC

(57) ABSTRACT

An electronic commerce system (10) includes a shared product data repository (34) that includes static product data for one or more products. The static product data is associated with dynamic product data stored in one or more seller databases (32). The system also includes a global content directory (42) that includes a plurality of product classes organized in a hierarchy. Each product class categorizes a number of products and is associated with one or more attributes of the products categorized in the product class. At least one of the product classes has one or more associated pointers that identify the shared product data repository (34). The system further includes a search interface (45) that communicates a search query to the shared product data repository (34) to search static product data stored in the shared product data repository (34) identified by one of the pointers. The system (10) also searches dynamic product data that is associated with the static product data and that is stored in one or more seller databases (32).

32 Claims, 4 Drawing Sheets

U.S. PATENT DOCUMENTS

| | | | | |
|---|---|---|---|---|
| 6,006,218 | A | 12/1999 | Breese et al. | 707/3 |
| 6,016,493 | A | 1/2000 | Burrows | 707/101 |
| 6,038,668 | A | 3/2000 | Chipman et al. | 713/201 |
| 6,049,673 | A | 4/2000 | McComb et al. | 395/712 |
| 6,078,891 | A | 6/2000 | Riordan et al. | 705/10 |
| 6,081,840 | A | 6/2000 | Zhao | 709/224 |
| 6,094,649 | A * | 7/2000 | Bowen et al. | 707/3 |
| 6,094,680 | A | 7/2000 | Hokanson | 709/223 |
| 6,101,515 | A | 8/2000 | Wical et al. | 707/531 |
| 6,105,134 | A | 8/2000 | Pinder et al. | 713/170 |
| 6,128,600 | A | 10/2000 | Imamura et al. | 705/27 |
| 6,128,624 | A | 10/2000 | Papierniak et al. | 707/104 |
| 6,144,996 | A | 11/2000 | Starnes et al. | 709/217 |
| 6,154,738 | A | 11/2000 | Call | 707/4 |
| 6,189,043 | B1 | 2/2001 | Buyukkoc et al. | 709/241 |
| 6,192,131 | B1 | 2/2001 | Geer, Jr. et al. | 380/283 |
| 6,199,082 | B1 * | 3/2001 | Ferrel et al. | 715/522 |
| 6,212,512 | B1 | 4/2001 | Barney et al. | 707/1 |
| 6,236,975 | B1 | 5/2001 | Boe et al. | 705/7 |
| 6,236,978 | B1 | 5/2001 | Tuzhilin | 705/26 |
| 6,271,846 | B1 | 8/2001 | Martinez et al. | 345/357 |
| 6,285,366 | B1 | 9/2001 | Ng et al. | 345/356 |
| 6,286,002 | B1 | 9/2001 | Axaopoulos et al. | 707/10 |
| 6,289,382 | B1 | 9/2001 | Bowman-Amuah | 709/226 |
| 6,324,522 | B2 | 11/2001 | Peterson et al. | 705/28 |
| 6,334,131 | B2 | 12/2001 | Chakrabarti et al. | 707/10 |
| 6,336,910 | B1 | 1/2002 | Ohta et al. | 604/6.13 |
| 6,341,280 | B1 | 1/2002 | Glass et al. | 707/3 |
| 6,343,287 | B1 | 1/2002 | Kumar et al. | 707/4 |
| 6,356,899 | B1 | 3/2002 | Chakrabarti et al. | 707/5 |
| 6,366,910 | B1 | 4/2002 | Rajaraman et al. | 707/5 |
| 6,370,527 | B1 | 4/2002 | Singhal | 707/6 |
| 6,389,409 | B1 * | 5/2002 | Horovitz et al. | 707/2 |
| 6,415,320 | B1 | 7/2002 | Hess et al. | 709/219 |
| 6,460,038 | B1 | 10/2002 | Khan et al. | 707/10 |
| 6,466,240 | B1 | 10/2002 | Maslov | 345/853 |
| 6,466,918 | B1 | 10/2002 | Spiegel et al. | 705/27 |
| 6,470,344 | B1 | 10/2002 | Kothuri et al. | 707/100 |
| 6,476,832 | B1 | 11/2002 | Park | 345/789 |
| 6,489,968 | B1 | 12/2002 | Ortega et al. | 345/713 |
| 6,490,567 | B1 | 12/2002 | Gregory | 705/39 |
| 6,490,619 | B1 | 12/2002 | Byrne et al. | 709/223 |
| 6,516,350 | B1 | 2/2003 | Lumelsky et al. | 709/226 |
| 6,532,481 | B1 | 3/2003 | Fassett, Jr. | 707/203 |
| 6,553,364 | B1 | 4/2003 | Wu | 707/1 |
| 6,581,072 | B1 | 6/2003 | Mathur et al. | 707/104.1 |
| 6,591,252 | B1 | 7/2003 | Young | 705/67 |
| 6,606,604 | B1 * | 8/2003 | Dutta | 705/26 |
| 6,668,254 | B2 * | 12/2003 | Matson et al. | 707/10 |
| 6,708,161 | B2 | 3/2004 | Tenorio et al. | 707/2 |
| 6,745,177 | B2 | 6/2004 | Kepler et al. | 707/3 |
| 6,754,666 | B1 * | 6/2004 | Brookler et al. | 707/102 |
| 6,775,655 | B1 | 8/2004 | Peinado et al. | 705/59 |
| 6,778,991 | B2 | 8/2004 | Tenorio | 707/10 |
| 6,850,900 | B1 * | 2/2005 | Hare et al. | 705/26 |
| 2001/0016846 | A1 | 8/2001 | Chakrabarti et al. | 707/102 |
| 2001/0032162 | A1 | 10/2001 | Alsberg et al. | 705/37 |
| 2001/0034814 | A1 | 10/2001 | Rosenzweig | 711/118 |
| 2001/0044751 | A1 | 11/2001 | Pugliese, III et al. | 705/26 |
| 2001/0051927 | A1 | 12/2001 | London et al. | 705/51 |
| 2002/0026386 | A1 | 2/2002 | Walden | 705/27 |
| 2002/0032597 | A1 * | 3/2002 | Chanos | 705/10 |
| 2002/0046187 | A1 | 4/2002 | Vargas et al. | 705/67 |
| 2002/0123955 | A1 | 9/2002 | Andreski et al. | 705/37 |
| 2002/0147704 | A1 | 10/2002 | Borchers | 707/3 |
| 2003/0033205 | A1 | 2/2003 | Nowers et al. | 705/26 |
| 2003/0149934 | A1 | 8/2003 | Worden | 715/513 |
| 2003/0167213 | A1 | 9/2003 | Jammes et al. | 705/27 |
| 2003/0195877 | A1 | 10/2003 | Ford et al. | 707/3 |
| 2004/0068576 | A1 | 4/2004 | Lindbo et al. | 709/232 |

OTHER PUBLICATIONS

Cohera: Internet Archive Wayback Machine, www.archive.org, www.cohera.com/products/papers.html; Feb. 25, 2000; 9pgs.*

Cohera: Internet Archive Wayback Machine, www.archive.org, www.cohera.com; Mar. 4, 2000; May 10 & 11, 2000, 18 pgs.*

TradeOut.com: Internet Archive Wayback Machine, www.archive.org, www.tradeout.com; Oct. 8, 1999; Jan. 14, 2000; May 11, 2000; 31 pgs.*

AT&L Knowledge Sharing System "Ask a Professor—Question & Answer Detail," 2 pages.

Unknown, "website2Go Commerce User Guide, Shopping Cart Online Help," webshop2Go User Guide, http://web.archive.org/web/20000824163512/http://shopguide.website2go.com/, 2 pages, Internet Date May 27, 2003.

Unknown, "1998-1999 Database Seminar Series," Uoft Data Base Group, Database Seminar, http://www.cs.toronto.edu/DB/main/seminars98.html, 4 pages, Internet Date May 27, 2003.

Unknown, "Pars International parleys its sales automation strengths into E-Commerce leadership using Java and IBM SanFrancisco," IBM Press Release Sep. 1998, Pars.com—IBM Press Release Sep. 1998, http://www.pars.com/Ultra/IBMPressRelease.htm, 3 pages, Internet Date May 27, 2003.

Unknown, "ONYX Internet Ltd, The Challenge," eBusiness Innovation Awards 1999, http://www.ecommerce-awards.com/awards2000/winners/1998/finalists/onyx.html, 2 pages, Internet Date May 28, 2003.

Unknown, "eBay—Your Personal Trading Community," http://web.archive.org/web/19990117033159/pages.ebay.com/aw/index.html, About eBay, SafeHarbor, Bookmarks eBay Store, Go Global!, 9 pages (last updated Jan. 16, 1999), Internet date May 28, 2003.

Unknown, "Welcome to Amazon.com," Amazon.com—Earth's Biggest Selection, http://web.archive.org/web/19991013091817/http://amazon.com/, 6 pages, Internet date May 23, 2003.

Unknown, "Northern Light Search," http://web.archive.org/web/19980206192654/http://www.northernlight.com/, 18 pages, Internet date May 28, 2003.

Tracy Marks, "Lesson Two: My Computer and Explorer continued, G. Explorer: Orientation," Windows 95 Manual, Lesson 2, Using Explorer, Copying Files, http://www.windweaver.com/w95man2g.htm, 4 pages (copyright 1995, '96, '97), Internet date May 23, 2003.

Unknown, "Sample Full Hit Highlighting Form, Query i2 against document /news/1690.asp," Microsoft® Index Server, http://www.industryweek.com/iisamples/issamples/oop/qfullhit.htw?CiWebHitsFile=%2Fnews, 2 pages, Internet Date Dec. 3, 2001.

Unknown, "Sample Full Hit Highlighting Form, Query trademmatrix again document /columns/text/689.asp," Microsoft® Index Server, http://www.industryweek.com/iisamples/issamples/oop/qfullhit.htw?CiWebHitsFile=%2Fcolum, 2 pages, Internet Date Dec. 3, 2001.

PCT, Notification of Transmittal of the International Search Report or the Declaration, 3 pages, Dec. 28, 2001.

PCT, Notification of Transmittal of the International Search Report or the Declaration, 3 pages, Dec. 31, 2001.

Unknown "UDDI Technical White Paper," Universal Description, Discovery and Integration, uddi.org. International Business Machines Corporation and Microsoft Corporation, 13 pages, Sep. 6, 2000.

U.S. Appl. No. 09/858,322, entitled "Pre-Qualifying Sellers During the Matching Phase of an Electronic Commerce Transaction," filed May 15, 2001, 40 total pages (.0839).

U.S. Appl. No. 09/858,269, entitled "Facilitating Electronic Commerce Transactions Using Buyer Profiles," filed May 15, 2001, 41 total pages. (.0842).

U.S. Appl. No. 09/884,393, entitled "Distributed Processing of Search Results in an Electronic Commerce System," filed Jun. 18, 2001, 47 total pages. (.0846).

U.S. Appl. No. 09/884,007, entitled "Content Enhancement in an Electronic Marketplace," filed Jun. 18, 2001, 44 total pages. (.0849).

U.S. Appl. No. 09/892,300, entitled "Providing Market Feedback Associated with Electronic Commerce Transactions to Sellers," filed Jun. 26, 2001, 43 total pages. (.0840).

U.S. Appl. No. 09/895,654, entitled "Translation Between Product Classification Schemas," filed Jun. 28, 2001, 39 total pages (.0841).

U.S. Appl. No. 09/895,525, entitled "Association of Data with a Product Classification Schema," filed Jun. 28, 2001, 50 total pages. (.0843).

U.S. Appl. No. 09/895,490, entitled "Third Party Certification of Content in Electronic Commerce Transactions," filed Jun. 29, 2001, 42 total pages. (.0845).

U.S. Appl. No. 09/895,489, entitled "Protecting Content from Unauthorized Reproduction," filed Jun. 29, 2001, 46 total pages. (.0847).

U.S. Appl. No. 09/895,894, entitled "Protecting Content from Unauthorized Reproduction," filed Jun. 29, 2001, 44 total pages. (.0848).

* cited by examiner

| | 152b | 152c | 152d | 152e | | 152n |
|---|---|---|---|---|---|---|
| PID | PRODUCT TYPE | MANUFACTURER | INK COLOR | TIP SIZE | ... | PRICE |
| 23 | BALL POINT | ABC | BLUE | MEDIUM | ... | 0.12 |
| 29 | BALL POINT | ABC | BLACK | MEDIUM | ... | 0.12 |
| 56 | BALL POINT | XYZ | BLACK | MEDIUM | ... | 0.13 |
| 98 | BALL POINT | XYZ | GREEN | MEDIUM | ... | 0.13 |
| ... | ... | ... | ... | ... | ... | ... |
| 12 | FELT TIP | XYZ | BLACK | BROAD | ... | 0.17 |
| 16 | FELT TIP | ABC | BLACK | BROAD | ... | 0.18 |
| 56 | FELT TIP | ABC | RED | FINE | ... | 0.16 |
| 123 | FELT TIP | XYZ | RED | FINE | ... | 0.16 |
| ... | ... | ... | ... | ... | ... | ... |
| 2 | ROLLER BALL | XYZ | BLUE | FINE | ... | 0.25 |
| 59 | ROLLER BALL | XYZ | BLACK | FINE | ... | 0.25 |
| 143 | ROLLER BALL | XYZ | BLACK | MEDIUM | ... | 0.22 |
| 456 | ROLLER BALL | ABC | RED | EXTRA FINE | ... | 0.29 |
| ... | ... | ... | ... | ... | ... | ... |

FACILITATING ELECTRONIC COMMERCE TRANSACTIONS USING A SHARED PRODUCT DATA REPOSITORY

TECHNICAL FIELD OF THE INVENTION

This invention relates to electronic commerce and more particularly to facilitating electronic commerce transactions using a shared product data repository.

BACKGROUND OF THE INVENTION

Due to the ever-increasing popularity and accessibility of the Internet as a medium of communication, the number of business transactions conducted using the Internet is also increasing, as are the numbers of buyers and sellers participating in electronic marketplaces providing a forum for these transactions. The majority of electronic commerce ("e-commerce") transactions occur when a buyer determines a need for a product, identifies a seller that provides that product, and accesses the seller's web site to arrange a purchase of the product. If the buyer does not have a preferred seller or if the buyer is purchasing the product for the first time, the buyer will often perform a search for a number of sellers that offer the product and then access numerous seller web sites to determine which seller offers certain desired product features at the best price and under the best terms for the buyer. The matching phase of e-commerce transactions (matching the buyer with a particular seller) is often inefficient because of the large amount of searching involved in finding a product and because once a particular product is found, the various offerings of that product by different sellers may not be easily compared.

SUMMARY OF THE INVENTION

According to the present invention, disadvantages and problems associated with previous e-commerce techniques have been substantially reduced or eliminated.

In one embodiment of the present invention, an electronic commerce system includes a shared product data repository that includes static product data for one or more products. The static product data is associated with dynamic product data stored in one or more seller databases. The system also includes a global content directory that includes a plurality of product classes organized in a hierarchy. Each product class categorizes a number of products and is associated with one or more attributes of the products categorized in the product class. At least one of the product classes has one or more associated pointers that identify the shared product data repository. The system further includes a search interface that communicates a search query to the shared product data repository to search static product data stored in the shared product data repository identified by one of the pointers. The system also searches dynamic product data that is associated with the static product data and that is stored in the one or more seller database.

Particular embodiments of the present invention may provide one or more technical advantages. For example, certain embodiments of the present invention provide a shared product data repository that includes product data that may be used by a number of sellers in conjunction with a global content directory. The use of product data in the shared product data repository allows sellers to provide their products through the global content directory without having to create a large amount product data or having to modify existing product data to conform with a format used by the global content directory. Therefore, the use of the shared product data repository provides a time and cost savings to sellers and encourages a larger number of sellers to participate in an e-commerce system that includes the global content directory.

Furthermore, particular embodiments of the present invention also allow sellers to provide dynamic product data in a seller database in addition to the static data in the shared product data repository. This dynamic product data may be associated with certain static product data in the shared product data repository and may be merged with the static data for the purposes of product searches by users of the global content directory. The storing of dynamic product data in the seller databases allows each seller to readily update the dynamic data. Other technical advantages may be readily apparent to those skilled in the art from the following figures, description, and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an example table of a seller database;

DETAILED DESCRIPTION OF EXAMPLE EMBODIMENTS

Figure 1:
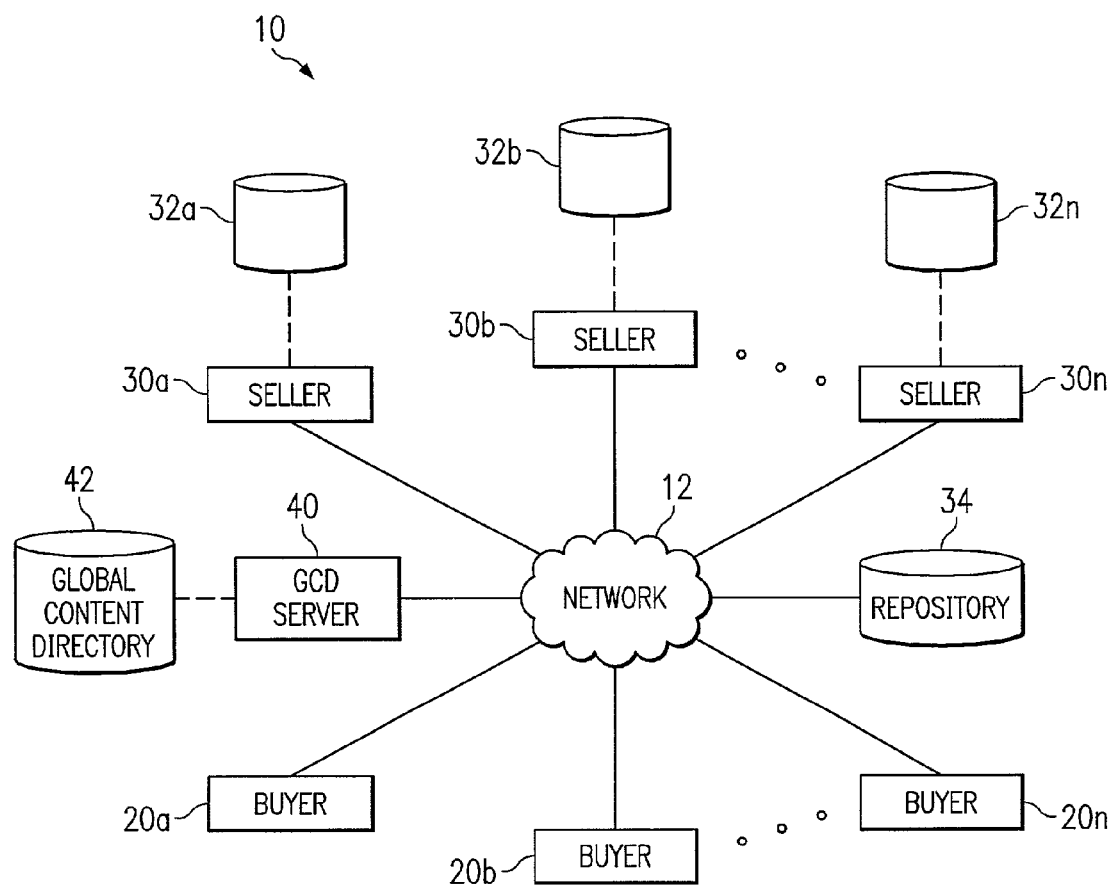
FIG. 1 illustrates an example electronic commerce system.

FIG. 1 illustrates an example system 10 that includes a network 12 coupling buyers 20, sellers 30, and a global content directory (GCD) server 40. System 10 enables electronic commerce ("e-commerce") transactions between buyers 20 and sellers 30 through the use of a GCD 42 supported by GCD server 40. GCD 42 may be internal or external to GCD server 40. Network 12 may include any appropriate combination of public and/or private networks coupling buyers 20, sellers 30, and GCD server 40. In an example embodiment, network 12 includes the Internet and any appropriate local area networks (LANs), metropolitan area networks (MANs), or wide area networks (WANs) coupling buyers 20, sellers 30, and GCD server 40 to the Internet. Since the Internet is accessible to the vast majority of buyers and sellers in the world, the present invention potentially includes all of these buyers and sellers as buyers 20 and sellers 30 associated with system 10. However, the use of the term "global" should not be interpreted as a geographic limitation necessarily requiring that GCD 42 provide directory services to buyers 20 and sellers 30 around the world (or in any other particular region) or that the content of GCD 42 be from all over the world (or from any other particular region).

Although buyers 20 and sellers 30 are described as separate entities, a buyer 20 in one transaction may be a seller 30 in another transaction, and vice versa. Moreover, reference to "buyer" or "seller" is meant to include a person, a computer system, an organization, or another entity where appropriate. For example, a buyer 20 may include a computer programmed to autonomously identify a need for a product, search for that product, and buy that product upon identifying a suitable seller. Although buying and selling are primarily described herein, the present invention contemplates any appropriate e-commerce transaction. Moreover, reference to "products" is meant to include goods, real property, services, information, or any other suitable tangible or intangible things.

A typical e-commerce transaction may involve a "matching" phase and a "transactional" phase. During the matching phase, a buyer 20 may search for a suitable product (meaning any good, real property, service, information, or other tangible or intangible thing that may be the subject of an e-commerce transaction) offered by one or more sellers 30, identify the most suitable seller 30 (which may involve, for example, identifying the seller 30 offering the lowest price), and contact that seller 30 to enter the transactional phase. During the transactional phase, the buyer 20 and seller 30 may negotiate a contract for the sale of the product (which may involve, for example, more clearly defining the subject of the transaction, negotiating a price, and reaching an agreement on supply logistics) and generate a legal document embodying the terms of the negotiated contract. To identify the most suitable seller 30 during the matching phase without the use of GCD 42, a buyer 20 may have to access numerous seller web sites to determine which seller 30 offers certain desired features of the product at the best price. Sellers 30 may each provide one or more databases 32, such as relational databases, that include data identifying the products available from sellers 30 and their features. Each database 32 may be accessed through the associated seller's web site or in any other appropriate manner. The multiple one-to-one (one buyer 20 to one seller 30) searches that this process requires are inefficient and expensive because of the large amount of searching involved in finding a product and because the various offerings of that product by different sellers 30 may not be easily compared.

Alternatively, multiple sellers 30 may be grouped in an electronic marketplace according to the products they provide and a buyer 20 may search the offerings of the multiple sellers 30 at a single web site. However, if buyer 20 wishes to obtain several different types of products, buyer 20 may have to go to several different types of marketplaces. Furthermore, there may be numerous competing marketplaces that buyer 20 has to search to perform the matching phase of a transaction for a particular product. One potential method of addressing this problem is to create a global product database that potentially includes data identifying the features of all the products that any buyer may wish to obtain. Therefore, the global database would include the combined contents of every database 32 associated with every seller 30. However, such a global database would have many problems. For example, the sheer size of the database would make it difficult to search and thus the database would suffer from performance problems. In addition, it would be difficult to allow large numbers of buyers 20 to search the database at once. Furthermore, all sellers 30 would be required to access the global database to update their information and the entire database would have to be updated each time a change is made. Many other problems might also exist.

A solution to the above problems, at least in part, is GCD 42. GCD 42 is a universal directory of the contents of multiple seller databases 32 (and potentially all seller databases 32). GCD 42 may be implemented using one or more servers 40 or other computers located at one or more locations. Most or all of the content in these seller databases 32 remains stored in databases 32, but this content is accessible using GCD 42. Therefore, like the global database described above, GCD 42 provides buyers 20 with access to product data relating to a multitude of products (and potentially seller data relating to one or more sellers 30 of the products), but unlike the global database, GCD 42 does not attempt to store all of this data in one enormous database. Where appropriate, reference to "data" is meant to include product data (meaning information reflecting values for certain attributes of a product), seller data (meaning information reflecting values for certain seller attributes), or both product data and seller data.

GCD 42 provides a directory of products using a directory structure in which products are organized using a hierarchical classification system. A buyer 20 may navigate or search the directory to find a particular product class into which products are categorized. The product data (and potentially seller data) associated with a product included in a product class may actually be stored in and obtained by GCD 42 from a seller database 32. However, the requested data may be transparently provided to buyer 20 such that all of the product data may appear to buyer 20 as being included in GCD 42. Although product and/or seller data has primarily been described as being stored in seller databases 32, the present invention contemplates product data being stored in any suitable manner and being retrieved from any suitable sources. For example, system 10 may include a shared data repository 34 that contains product data and/or seller data that may be combined with data from one or more seller databases 32, as described in further detail below.

Figure 2:
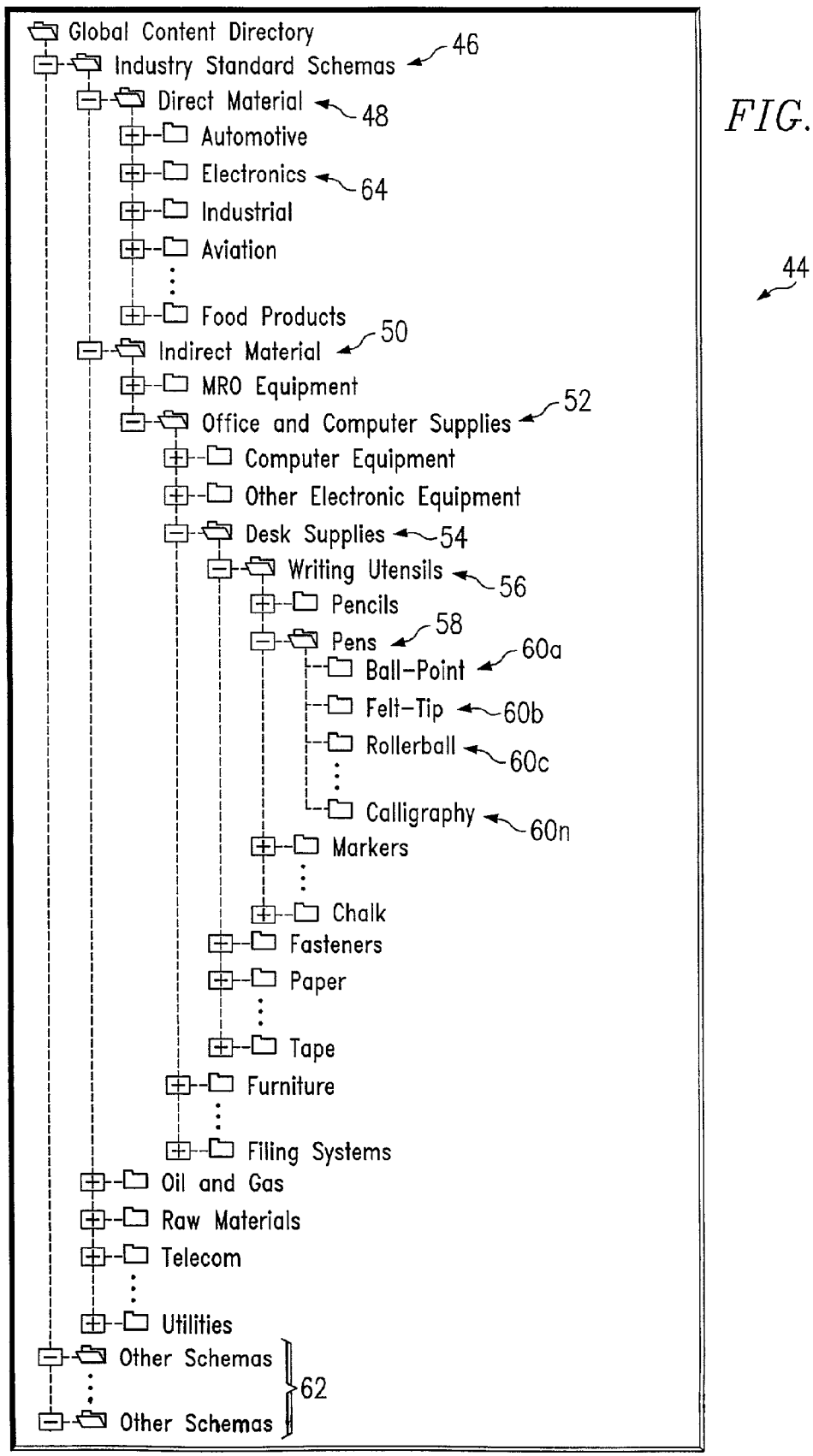
FIG. 2 illustrates an example directory structure of an example global content directory.

FIG. 2 illustrates an example directory structure 44 of an example GCD 42. Products categorized in GCD 42 may be organized according to schemas. A schema may include a set of product classes (which may be referred to as a "taxonomy") organized in a hierarchy, each class being associated with a set of product features, characteristics, or other product attributes (which may be referred to as a "product ontology"). For example, pens may have different kinds of tips (such as ball point or felt tip), different tip sizes (such as fine, medium, or broad), and different ink colors (such as blue, black, or red). Accordingly, a schema may include a class corresponding to pens that has a product ontology including tip type, tip size, and color, or other appropriate attributes. Within a class, products may be defined by product attribute values (such as, for example, ball point, medium tip, blue ink). Reference to "value" is meant to include any appropriate data reflecting an instance of a product attribute or a seller attribute. Product attribute values and seller attribute values may include numbers, letters, figures, characters, symbols, or other suitable information for describing a product or a seller, respectively. In one embodiment, a product ontology may be divided into entry-required attributes (meaning attributes for which a value has to be provided) and entry-optional attributes (meaning attributes for which a value is optional), and these categories may be further divided into commercial features and design features (or any other suitable divisions).

In addition to a taxonomy and product ontologies, a schema may include a set of attributes for each seller (which may be referred to as a "seller ontology"). Such attributes may include geographic restrictions (such as served markets), currencies accepted by each seller, collaboration tools accepted by each seller, contract terms accepted by each seller, types of contracts accepted by each seller, levels of buyer credit required by each seller, and any other suitable seller attributes. Similar to a products within a product class, sellers offering products within a product class may be defined by seller attribute values corresponding to seller attributes. Accordingly, a schema may include a set of classes, each including one or more products, and each class may be associated with a set of product attributes and a set of seller attributes.

In example directory structure 44, products may be organized and cataloged according to industry standard schemas 46 or other appropriate schemas, as described below. Within industry standard schemas 46, there are two example classes: a direct materials class 48 and an indirect materials class 50. Each of these classes 48 and 50 includes several sub-classes (which may themselves include sub-classes). Therefore, the numerous classes of directory structure 44 form a "tree-like" hierarchical structure into which products may be categorized. For example purposes, certain portions of directory structure 44 are "expanded" in FIG. 2 to show various levels of classes. The "level" of a class is indicated by the number of other classes between that class and a root class (such as industry standard schemas class 46). For example, indirect material class 50 is at the same level in directory structure as direct material class 48. Indirect material class 50 may include an office and computer supplies class 52, which includes a desk supplies class 54, which includes a writing utensils class 56. Furthermore, writing utensils class 56 includes a pens class 58, which includes numerous pen type classes 60a-60n ("n" indicating that any number of classes 60 may be included in pens class 58). Each of classes 50, 52, 54, 56, 58, and 60 is located at a different level of directory structure 44. A class at any level in directory structure 44 may include one or more sub-classes, those sub-classes may include one or more sub-classes, and so on until a desired specificity of categorization is reached. A series of classes from a highest level class (the broadest class) to a lowest level class (the most specific class) may be referred to as a "branch" of directory structure 44. For example, classes 46, 48, 50, 52, 54, 56, 58, and 60b form one branch of directory structure 44.

Although example directory structure 44 may use industry standard schemas 46 as described above, any other appropriate schemas 62 may be used in addition to or instead of industry standard schemas 46. For example, while industry standard schemas 46 may be organized from a seller's viewpoint, other schemas 62 may be used that organize products from a buyer's viewpoint. For example, a buyer 20 may wish to furnish a kitchen of a new house with various products, such as appliances, window treatments, paint, cabinetry, plumbing, dishes, and cooking utensils. Using one schema 62, these products may be organized into a variety of unrelated classes based on certain features of the products (for example, certain kitchen appliances may be categorized in an electronics class 52 of directory structure 44 while paint may be categorized into an industrial class 52). However, another example schema 62 may categorize all such products into a home products class (which may include several classes further categorizing the products, such as a kitchen products class which includes a kitchen appliances class, which includes a refrigerator class, and so on). Therefore, the same product may be included in multiple schemas 62. These alternative schemas may be included in directory structure 44 and may be stored as a part of or separate from GCD 42.

A buyer 20 may navigate through directory structure 44 by expanding or collapsing various classes as desired. For example, FIG. 2 illustrates an expansion of certain classes of directory structure 44 to reach a felt-tip pen class 60b. Once a buyer 20 has navigated to a class that is specific enough for buyer 20 (and/or a class that is at the end of a branch), buyer 20 may perform a search for products within that class. For example, buyer 20 can search for all products in writing utensils class 56 that are blue felt-tip pins having medium tips. Alternatively, if buyer 20 navigates to the end of a branch of directory structure 44, such as felt-tip pen class 60b, GCD 42 may then enable buyer 20 to search for such pens that have blue ink and medium tips (which may reach the same result as the search above).

Buyer 20 may also search for sellers matching one or more seller attribute values within a product class. For example, in addition to searching for all products in writing utensils class 56 that are blue felt-tip pins having medium tips, buyer 20 may search for sellers 30 serving Texas that accept U.S. dollars. Buyer 20 may search for products matching certain product attribute values and sellers matching certain seller attribute values in any appropriate manner. In one embodiment, for example, buyer 20 provides search criteria including both values for product attributes and for seller attributes (search criteria may instead be generated automatically, in whole or in part, as described below), and server 40 searches for products that match the product attribute criteria and are offered by sellers matching the seller attribute criteria. In another embodiment, buyer 20 provides only product attribute values as search criteria, and server 40 limits its search for products matching the product attribute criteria to databases 32 associated with sellers 30 known to match seller attribute criteria that buyer 20 may want according to a buyer profile or otherwise.

As described above, in one embodiment product data (at least product data more detailed than data provided by a taxonomy) and seller data are not stored in GCD 42, but are stored in databases 32. For example, a seller 30 may maintain a relational database 32 that includes a plurality of tables containing product attribute values for a variety of products and seller attribute values for each product, a set of products, or all of the products offered by seller 30. Product data and seller data may be integrated into one or more tables or may be segregated into different tables. Moreover, product data and seller data for a seller 30 may be stored in the same or separate databases. One or more pointers may be associated with each class to identify the location of one or more databases 32 that include product data and/or seller data for products contained in that class or to identify particular data in databases 32. Therefore, GCD 42 may execute a search for products in databases 32 identified by a pointer corresponding to a user-selected (or automatically selected) class. GCD 42 may also return the network location (such as a uniform resource locator (URL) or other network address) of the database 32 to buyer 20 so that buyer 20 may independently access database 32. Databases 32 may be searched using any appropriate method including, but not limited to, a structured query language (SQL) query.

GCD 42 may be implemented using the lightweight directory access protocol (LDAP), which enables directories to be provided using the tree-like structure described above. However, any other appropriate technique or protocol for creating GCD 42 may alternatively be used and GCD 42 may have any appropriate structure. Furthermore, GCD 42 may be an object-oriented directory (which is also provided by LDAP) such that each class in directory structure 44 includes the attributes of parent classes in which the class is a sub-class. In this embodiment, a product class listed at the end of a branch of the tree structure includes all of the attributes of its parent classes in the branch. Furthermore, each product included in a database 32 may be an object that includes all the attributes of the classes in which the product is included. Thus, when a search is performed from a class at the end of a branch of directory structure 44, the search query may automatically include any appropriate attributes of parent classes of the class.

For example, if a buyer 20 has navigated through directory structure 44 to felt-tip pens class 60b, a search performed by buyer 20 (or by GCD 42 on behalf of buyer 20) from felt-tip pens class 60b may automatically be limited to a search for felt-tip pens and buyer 20 may introduce additional desired search criteria (such as blue ink and medium tip). Therefore, if a database 32 searched includes product data relating to a variety of writing utensils, a search of database 32 may be automatically limited by GCD 42 to only include felt-tip pens within that database 32. Buyer 20 may also identify additional product attribute values and/or seller attribute values as additional search criteria.

When GCD 42 has performed a search of the databases 32 identified by a pointer or pointers associated with a class that buyer 20 has selected (or that has been automatically selected), GCD 42 may return product data and/or seller data associated with one or more products matching the search criteria. GCD 42 may integrate the product data and/or seller data resulting from the search into directory structure 44 so that the data appears to buyer 20 as being part of GCD 42. GCD 42 may alternatively present the results of the search in any other appropriate manner. Each product resulting from the search may be an object which is unique instance of the class in which buyer 20 is searching. Furthermore, each such object (and its location) may be uniquely identified using a numbering scheme corresponding to directory structure 44.

In summary, a buyer 20 may search for a product matching certain product attribute values available from a seller matching certain seller attribute values using GCD 42 and thus eliminate or reduce the need for buyer 20 to individually search numerous seller databases 32 to find the desired product available from a suitable seller. GCD 42 provides access to product and/or seller data relating to these numerous products using directory structure 44, which organizes products using a hierarchical, object-oriented classification system. Buyer 20 may navigate or search directory structure 44 to find a particular classification of products and various information associated with the products within this classification, initiate a search of databases 32 including product and/or seller data relating to a product, and then communicate with an appropriate database 32 through GCD server 40 or otherwise. Such access to vast numbers of products is provided without the requirement that all data about the products and/or sellers be stored in a global database. Instead, this data may be stored in seller databases 32 that can be readily accessed using GCD 42.

One problem that may be associated with the use of the various seller databases 32 is that these databases 32 may include product data about the same class of product (for example, felt-tip pens), but may identify products of that class using different attribute values, may use different names for the same product attribute value, and/or may quantify or distinguish product attribute values differently (using different units of measurement, for example). The same may be true for seller data that may be contained in databases 32. Some of these issues may be solved using translation mechanisms that convert the data into a uniform format used by GCD 42. Alternatively, sellers 30 may create new databases 32 or manually modify existing databases 32 (or may hire a third party to create or modify databases 32) to conform to a uniform standard in anticipation of a database 32 being used in association with GCD 42.

One disadvantage to seller 30 (or a third party) creating data that is appropriate for use with GCD 42 is that the generation of such data is typically expensive and time-consuming. If seller 30 has already created product data (for example, for access by buyers 20 using the seller's web site), seller 30 may be reluctant to repeat the process and expense of recreating, expanding, reformatting, translating, or otherwise modifying existing product data into a format appropriate for use with GCD 42. However, if seller 30 does not properly format its product data and instead uses a pre-existing data format in conjunction with GCD 42, the seller's product data may not be properly associated with GCD 42 and seller 30 may be disadvantaged during the matching phase of a transaction. For example, if the product ontology associated with pens class 58 in directory structure 44 includes ink color as a product attribute and seller 30 does not have this information in its product data or does not refer to this information as "ink color" in its database 32, then a search conducted using GCD 42 for pens having a particular ink color may not properly identify products in database 32 that meet the search criteria. Alternatively, the seller's products may be identified in the search results, but may be ranked lower in the search results since seller 30 does not provide information about the ink color or does provide the information but does not format the information appropriately for use with GCD 42.

One solution to the above problem is to provide a shared product data repository 34 that includes product data relating to numerous common products and which is properly formatted and complete for use with GCD 42. The product data in repository 34 may be made available, for a fee or otherwise, to sellers 30 who do not wish to create (or pay a third party to create) product data for use with GCD 42 or recreate, expand, reformat, translate, or otherwise modify existing product data for use with GCD 42. As an example only, although hundreds of sellers 30 participating in system 10 may sell pens, there may be only a few manufacturers that make the pens sold by sellers 30. Therefore, it may be more efficient and cost effective for the manufacturers to create much of the product data for the pens that they produce and provide this data in repository 34 instead of each seller 30 creating redundant product data for the pens. Alternatively, the product data in repository 34 may be created by an entity associated with GCD 42 or any other appropriate entity.

Product data relating to a particular product that is not seller-specific and/or that changes relatively infrequently (compared to "dynamic" product data, described below) may be created by the manufacturer or another entity and stored in repository 34 for use by sellers 30. This data may be referred to as "static" product data. Examples of static product data relating to a pen may include data relating to ink color, tip type, and tip size of the pen. Other product data relating to a product that is seller-specific and/or that changes relatively frequently (compared to "static" product data) may be created by sellers 30 and stored in seller databases 32. This data may be referred to as "dynamic" product data. Examples of dynamic product data relating to a pen may include data relating to the price, availability, and lead time associated with the pen. Optimally, the combination of the static and dynamic data relating to a particular product will include values for each of the product attributes included in the product ontology of the classes of GCD 42 in which the product is classified. For example, pens class 58 in GCD 42 may have an associated product ontology that includes ink color, tip type, tip size, price, availability, and lead time attributes. Preferably the combination of static product data in repository 34 and dynamic product data in a seller database 32 relating to the pen includes values for each of these product attributes.

When a seller 30 wishes to sell a product using GCD 42, the seller 30 may first determine whether repository 34 includes static product data for the product. Seller 30 may obtain information regarding what product data is included in repository 34 by querying GCD server 40, by querying an entity associated with the repository 34, by directly accessing repository 34, or using any other appropriate technique. If static data for the particular product or products is included in repository 34, then seller 30 may request that the static product data be associated with seller 30 and one or more of its products. As described above, one or more pointers may be associated with each class to identify the location of one or more seller databases 32 that include product data for products contained in that class or to identify particular data in databases 32. In addition, pointers associated with a class may identify the location of a repository 34 and may identify particular data in repository 34. Furthermore, one or more pointers to repository 34 may be linked to one or more pointers to a seller database 32 such that the information from the seller database 32 and repository 34 may be merged. Alternatively, the static product data in repository 34 may be linked with one or more sets of dynamic product data in one or more seller databases 32. Dynamic product data from seller database 32 may be merged with static product data from repository 34 and the combined data may be provided to a buyer 20 as a result of a product search, as is described in further detail below with reference to FIG. 5.

Although repository 34 is illustrated as a single storage location, repository 34 may include multiple storage locations at the same or different physical locations. Any appropriate number of storage locations located in a number of physical locations may be used (for example, the storage locations may be distributed in various geographic regions). GCD server 40 may search each of these distributed repositories 34 as appropriate to obtain static product data that is responsive to a buyer's search. Alternatively, pointers associated with a class may direct GCD server 40 to one or more particular storage locations. In addition, if multiple repositories 34 are used, each repository 34 may include identical product data, some common and some different product data, or entirely different product data. Furthermore, repository or repositories 34 may store the product data in any appropriate format using any appropriate storage medium. Moreover, it should be noted that although shared product data repository is described as including static product data, seller databases 32 may also include static product data. This static product data may or not be made available to buyers 20 using GCD 42.

FIG. 3 illustrates an example table 150 that may be included in a seller database 32 and/or repository 34. Database 32 and repository 34 may include one or more tables 150, and each table 150 may contain data relating to one or more products. For example, example table 150 includes data relating to different types of pens. Table 150 may also include data for other types of products (for example, other types of office supplies), or such data may be contained in other tables 150 in database 32 and/or repository 34. Table 150 includes a plurality of columns 152 that each include data relating to a particular product attribute or seller attribute. Although an example number of columns 152 including example product attribute values and seller attribute values are illustrated, it should be understood that any appropriate number and type of product attributes, seller attributes, or other categories of data may be included in table 150. Moreover, as described briefly above, seller data and product data may be segregated into different tables instead of being integrated into the same table as shown in example table 150.

Table 150 also includes a number of rows 154 that may each correspond to a particular product and that each include values for one or more of the product attributes and seller attributes. Each of the values (which may be numeric, textual, or in any other appropriate format) is located at the intersection of the row 154 associated with a particular product and the column 152 that includes a particular product attribute or seller attribute. Each of these intersections may be referred to as a field or cell 156 of table 150. Where seller data and product data are integrated, each row 154 may contain all of the product data and seller data for the product corresponding to that row 154. Alternatively, there may be a row or set of rows dedicated to seller data that may apply to all products offered by a seller 30 or a subset of all such products. Where seller data and product data are segregated, each row in the seller data table may correspond to a set of seller attribute values that may be linked to a set of one or more products in the product data table such that seller data for a product may be accessed when product data for that product is accessed, and vice versa.

The data in one or more columns 152 of table 150 may be indexed to increase the speed with which database reads may be conducted. For example, the fields 156 of ink color column 152d and tip size column 152e may be indexed so that a database query for a pen having a particular ink color and tip size may be quickly performed. Data in table 150 may be indexed using any appropriate database indexing technique. The typical result of such indexing is that when GCD 42 or a buyer 20 requests indexed data from a database 32 and/or repository 34, the associated database management system (or other appropriate interface to database 32 and/or repository 34) does not have to search through every field 156 in the tables 150 included in database 32 and/or repository 34 to locate the requested data. Instead, the data may be indexed such that when a query is submitted for products having certain product attribute values and/or sellers 30 having certain seller attribute values that have been indexed, the database management system already knows the locations of such products in table 150 and may return data associated with these products without searching the entire table 150 or database 32 and/or repository 34 for the products. For example, if the ink color fields 156 and tip size fields 156 of columns 152d and 152e, respectively, are indexed, the index will typically identify the location of all products having black ink and a medium tip size.

If a query is submitted that also specifies a value of one or more non-indexed product attributes (for example, a query for pens manufactured by ABC Company, if the manufacturer fields 156 in column 152c are not indexed) and/or seller attributes, then the associated database management system may perform a search of database 32 and/or repository 34 for products that include the specified value of the one or more non-indexed attributes or seller attributes. However, such a search may be limited to the products already identified (using the index) as including specified values of indexed attributes (for example, pens having black ink and a medium tip) and/or seller attributes that are also included in the search. Therefore, the amount of time required to perform the search may be reduced even though one or more of the product attribute values or seller attribute values that are searched for are not indexed.

Figure 4:
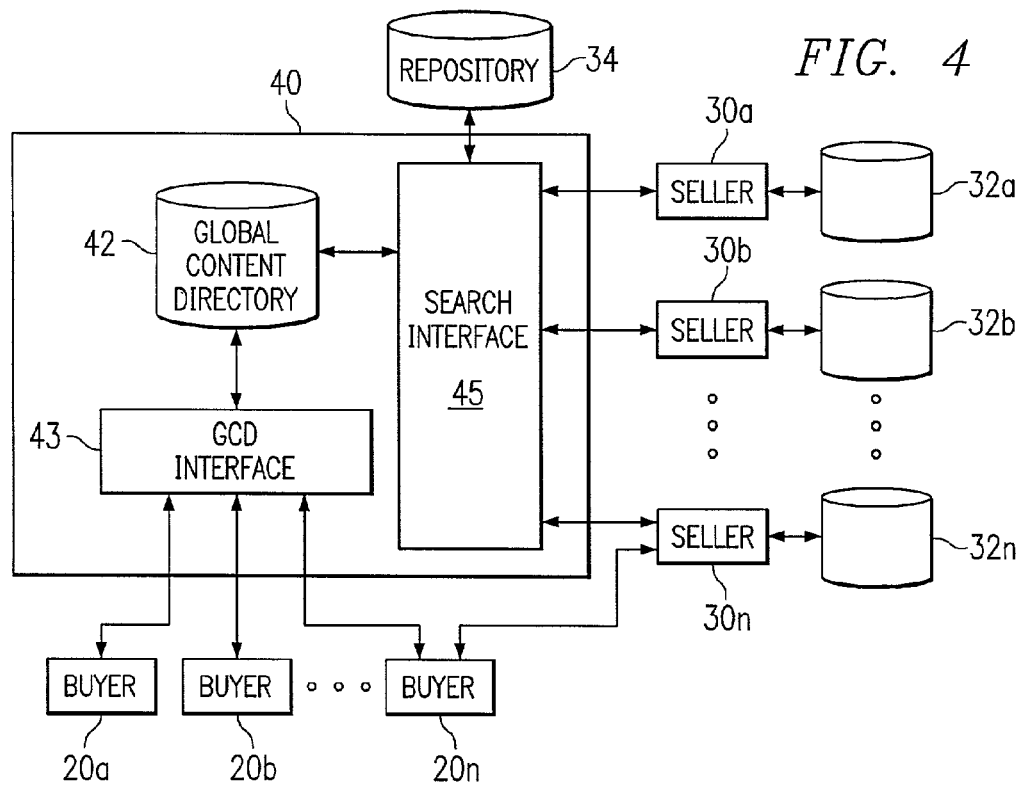
FIG. 4 illustrates an example electronic commerce system in further detail.

FIG. 4 illustrates an example e-commerce system 10 in further detail. As described above, numerous buyers 20 and sellers 30 may be coupled to GCD server 40 using network 12. Buyers 20 may access server 40 using a web browser or in any other appropriate manner and server 40 may provide buyers 20 with access to GCD 42 using a web server or in any other appropriate manner. Although GCD 42 is shown as being internal to GCD server 40, GCD 42 may be internal or external to GCD server 40, as described above. GCD server 40 may also include hardware and/or software for implementing one or more GCD interfaces 43. A buyer 20 may access server 40 and use a GCD interface 43 to search or navigate GCD 42 and/or seller databases 32. Information may be communicated between buyers 20, sellers 30, and GCD 42 using hypertext transport protocol (HTTP), extensible markup language (XML), simple object access protocol (SOAP), or any other suitable communication technique. Each buyer 20 and seller 30 may be issued a unique identifier so that the participants in a transaction facilitated by GCD 42 may be identified. Each buyer 20 and seller 30 may also be assigned a role with respect to a transaction. As described above, a buyer 20 in one transaction may be a seller 30 in another transaction, and vice versa.

In an example transaction, a buyer 20 may access a GCD interface 43 and perform a search of GCD 42. GCD interface 43 may allow buyer 20 to both navigate or "browse" the classes of GCD 42 and to search for a particular class or classes. For example, buyer 20 may either navigate GCD 42 to find a class into which pens are categorized or buyer 20 may search GCD 42 for class names including the word "pen." Any other suitable methods for identifying a particular class may also be used. When buyer 20 has located the appropriate class for the product buyer 20 desires, buyer 20 may then request a listing of products in that class matching certain product attribute values. For example, if buyer 20 is browsing felt-tip pens class 60b, buyer 20 may request all products in class 60b (felt-tip pens) that have red ink and a fine tip and that are sold by a seller 30 located in the United States.

A search interface 45, or any other appropriate component of GCD server 40, may facilitate such a request by searching or requesting searches of repository 34 and/or seller databases 32 identified by one or more pointers associated with felt-tip pens class 60b, as described above. Search interface 45 may provide buyer 20 a search form in which to enter one or more search criteria. The types of search criteria that may be used may be identified in the search form or buyer may be allowed to perform a general search of databases 32 and/or repository 34 for certain terms. For example, search interface 45 may provide buyer 20 with a search form tailored for class 60b that includes fields where buyer 20 can specify a desired ink color, tip thickness, or any other appropriate product-related or seller-related criteria. In one embodiment, the fields of the search form correspond to some or all of the product attributes within the product ontology and/or seller attributes within the seller ontology corresponding to the product class that has been selected, and buyer 20 may enter values for the product attributes and seller attributes in the corresponding search form fields. In lieu of a search form, search interface 45 may instead provide a single field where buyer can enter in desired search terms, such as "red" and "fine" (multiple search terms may be entered using Boolean operators or any other appropriate technique).

Search interface 45, or any other appropriate component of GCD server 40, may also facilitate search requests by accessing a buyer profile for buyer 20 containing information compiled from previous search requests made by buyer 20, previous e-commerce transactions involving buyer 20, or other events or actions on the part of buyer 20. For example, a buyer profile may contain a list of sellers 30 matching seller attribute values that buyer 20 may want. Such a list may be compiled from the results of previous searches by buyer 20. Search interface 45 may access the profile for buyer 20 for any suitable purpose. In one embodiment, search interface 45 may access the profile for buyer 20 to automatically generate search criteria, such as product attribute values and/or seller attribute values, for a search. Search interface 45 may also access the profile for buyer 20 to limit its search for products matching product attribute values provided by buyer 20 (or generated automatically) to databases 32 associated with sellers 30 known to match seller attribute values that buyer 20 may want (and/or data in repository 34 associated with such sellers 30).

Based on search criteria provided by buyer 20 or automatically generated, search interface 45 may communicate a query to the appropriate seller database(s) 32 and/or repository 34 requesting that databases 32 and/or repository 34 each return a listing of all products (including associated product data and/or seller data) that meet the search criteria. Databases 32 and/or repository 34 may also return data relating to attribute values that were not included in the search criteria. For example, databases 32 may return a price and availability of products that meet the search criteria even if price and availability were not search criteria. The responses to the queries of databases 32 and/or repository 34 may be displayed to buyer 20 in any appropriate manner. For example, the products may be listed in order of relevance to the search criteria according to any suitable matching criteria. Furthermore, GCD 42 may reorder the product listing based on a request from buyer 20. For example, buyer 20 may request that the matching products be listed in order from least expensive to most expensive. Alternatively, the search results may be communicated directly to buyer 20 from databases 32 and/or repository 34.

Buyer 20 may select a product from the product listing to indicate a desire to initiate a transaction regarding the product, such as a purchase of the product. On such a selection, GCD 42 may communicate a repository identifier (RID) identifying the selected seller 30 and a globally unique identifier (GUID) for the product to buyer 20. For example, an RID may be the network address (such as an IP address) of a seller network node 30 or may be associated with the network address in a table (in which case GCD 42 may use the RID to look up the associated network address and then communicate the network address to buyer 20). Buyer may access the seller 30 using the RID (or network address) and request a transaction regarding the product using the GUID. GCD 42 may even provide a link including a URL of a web site associated with the seller 30 or may provide another appropriate method for buyer 20 to be connected to seller 20. Although only a single example arrow (between buyer 20n and seller 30n) is shown to illustrate communication between buyers 20 and sellers 30, it should be understood that any buyer 20 may communicate with any seller 30 to conduct appropriate transactions.

Figure 5:
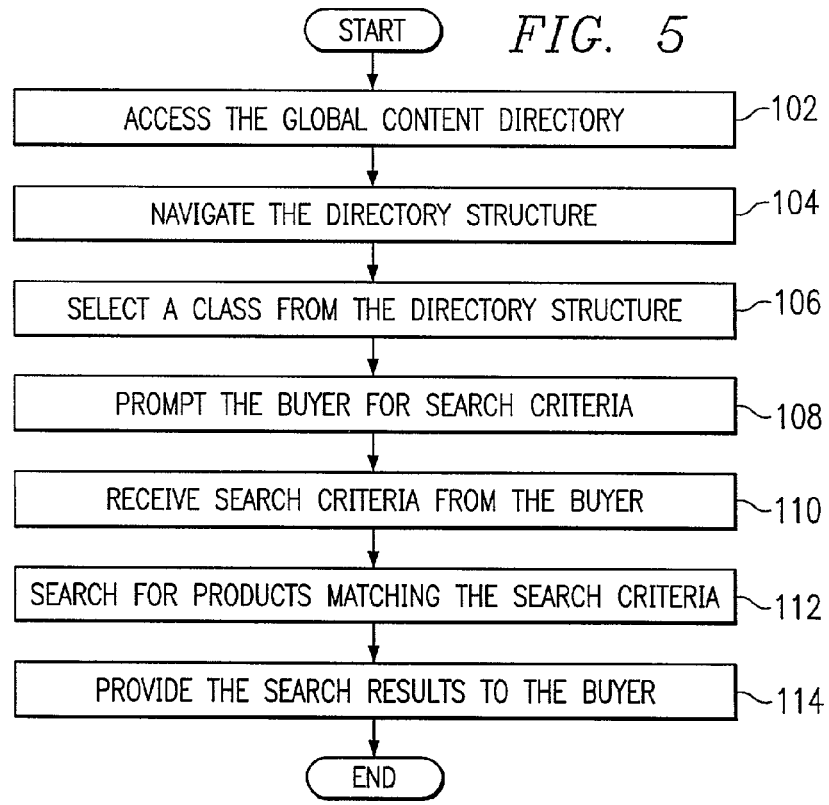
FIG. 5 illustrates an example method for searching product data using a global content directory.

FIG. 5 illustrates an example method for searching product data using GCD 42. The method begins at step 102, where buyer 20 accesses GCD 42 using GCD interface 43. As described above, buyers 20 may access GCD 42 using a web browser or in any other appropriate manner. Buyer 20 navigates directory structure 44 at step 104 to a class that is specific enough for buyer 20 (and/or a class that is at the end of a branch), as described above. At step 106, buyer 20 selects the class. Buyer 20 may also request a search of a product class appearing in a "frequently searched product classes" list that may be maintained for the convenience of buyer 20 without having to navigate a list of classes. Such a list may be stored in a buyer profile, described above, or elsewhere by GCD server 40 or another computer accessible to buyer 20. As an alternative to steps 104 and 106, a class may be automatically selected based on a buyer profile. When a class has been selected, buyer 20 is prompted at step 108 to enter search criteria. For example, as described above, server 40 may provide buyer 20 a search form in which to enter one or more search criteria or a single field where buyer 20 may enter desired criteria, and the fields of the search form may correspond to some or all of the product attributes within the product ontology and/or seller attributes within the seller ontology corresponding to the product class that has been selected. Such criteria may include product attribute values, seller attribute values, or a combination of product attribute values and seller attribute values.

At step 110, buyer 20 provides desired search criteria. Alternatively, GCD server 40 may automatically generate some or all of the search criteria. Using the search criteria provided by buyer 20 or otherwise generated, search interface 45 searches, at step 112, for products matching the search criteria in repository 34 and/or one or more databases 32 containing product data associated with products within the class selected by buyer 20. Search interface 45 may perform the search in any appropriate manner. For example, based on a pointer associated with a class, server 40 first may search repository 34 or a portion of repository 34 (that is identified by the pointer) for static product data matching the search criteria and then may search a seller database or databases 32 (identified by the same pointer or an associated pointer) for dynamic product data. For instance, the static product data in repository 34 may have an associated pointer to each seller database 32 providing dynamic product data to complement the static product data. Alternatively, this searching may be performed in the opposite order or using any other appropriate techniques. The resulting dynamic and/or static product data obtained from repository 34 and/or seller database(s) 32 may be merged and presented to a buyer 20 as a unified set of search results. When determining whether a particular product meets a buyer's search criteria, the static product data or dynamic product data relating to the product may be searched sequentially or the static and dynamic product data may first be merged together and then searched against the search criteria. At step 114, server 40 presents one or more products matching (or partially matching) the search criteria to buyer 20, and the method ends. Alternatively, the results of the search query may be communicated directly from repository 34 and/or seller database(s) 32 to buyer 20.

It should be noted that although the foregoing description indicates that a buyer 20 may perform a search for a product using GCD server 40, buyers 20 may also perform searches from a web site associated with a seller 30. In such a situation, seller 30 may still subscribe to static product data in repository 34. Therefore, when a buyer 20 performs a search for a product associated with seller 30, a search engine associated with the seller's web site may have access to and search static data in repository 34 and dynamic data in the seller's database 32, as described above. Therefore, if a buyer 20 has already determined a seller 30 from which buyer 20 wishes to purchase a product, buyer 20 need not use GCD server 40 to perform a product search, even though some of the product data for the seller's products may be stored in repository 34.

Although the present invention has been described with several embodiments, divers changes, substitutions, variations, alterations, and modifications may be suggested to one skilled in the art, and it is intended that the invention encompass all such changes, substitutions, variations, alterations, and modifications falling within the spirit and scope of the appended claims.

What is claimed is:

1. An electronic commerce system, comprising:
    a storage medium stored therein a shared product data repository including static product data for one or more products, the static product data associated with dynamic product data stored in one or more seller databases each associated with one or more sellers, the static product data and associated dynamic product data identifying products available from the one or more sellers, the static product data and associated dynamic product data comprising values of attributes of the one or more available products;
    a global content directory server providing a global content directory of products available from the one or more sellers to a plurality of user client computers in communication over a network, the global content directory server comprising:
        a storage medium stored therein a directory structure including a plurality of product classes organized in a hierarchy, each product class categorizing a plurality of products and associated with one or more attributes of the products categorized in the product class, one or more of the product classes having one or more associated pointers that identify a shared product data repository in which static product data for at least one of the one or more products stored in the shared product data repository associated with the product class is stored, the static product data associated with dynamic product data for at least one of the one or more products stored in the one or more seller databases each associated with one or more sellers, the static product data and associated dynamic product data identifying products available from the one or more sellers, the static product data and associated dynamic product data comprising values of attributes of the one or more available products, the global content directory server comprising at least a portion of contents of the shared product data repository and the one or more seller databases; and
        a server search interface to communicate a search query to the shared product data repository for static product data and to initiate a search of one or more seller databases for dynamic product data that is associated with the static product data;
    wherein upon receiving a selection of a product class from one of the plurality of users, the product class having a pointer identifying the shared product data repository and in response to the selection of the product class by the user, the global content directory server initiates a search, the server search interface:
        communicates a search query to the shared product data repository to search static product data for at least one of the one or more products stored in the shared product data repository; and
        for static product data matching the search criteria, communicates a search query to one or more seller databases to search dynamic product data for at least one of the one or more products stored in the one or more seller databases that is associated with the static product data for at least one of the one or more products stored in the shared product data repository matching the search criteria; and
    wherein the product search results are communicated to the user.

2. The system of claim 1, wherein at least one of the one or more pointers identify static product data in the shared product data repository.

3. The system of claim 1, wherein at least one product class includes one or more first pointers that identify static product data for at least one of the one or more products stored in the shared product data repository and one or more second pointers that identify one or more seller databases having for at least one of the one or more products stored in the one or more seller databases dynamic product data that is associated with the identified static product data.

4. The system of claim 1, wherein the shared product data repository further comprises at least one pointer to a seller database having dynamic product data that is associated with static product data for at least one of the one or more products stored in the shared product data repository.

5. The system of claim 1, wherein the server search interface communicates a first search query to the shared product data repository to search static product data for at least one of the one or more products stored in the shared product data repository and to communicate a second search query to one or more seller databases to search dynamic product data for at least one of the one or more products stored in the one or more seller databases.

6. The system of claim 1, wherein the search query comprises desired values, specified by a user of the global content directory, for one or more of the product attributes associated with the selected product class.

7. The system of claim 1, wherein the server search interface further:
receives search results from the shared product data repository and one or more seller databases in response to the search query, the search results including static product data for at least one of the one or more products stored in the shared product data repository and dynamic product data for at least one of the one or more products stored in the one or more seller databases associated with one or more products satisfying the search query; and
communicates the search results to a user of the global content directory, wherein the search results include dynamic product data for at least one of the one or more products stored in the one or more seller databases representative of at least one of a price, an availability, and a lead time associated with the product.

8. The system of claim 7, wherein the global content directory further:
receives a selection from the user of a product for which product data is included in the search results; and
communicates address information associated with a seller database that includes product data for the selected product, the address information enabling the user to communicate with a seller associated with the seller database to conduct a commerce transaction relating to the selected product.

9. The system of claim 1, wherein the server search interface further communicates the location of a user of the global content directory to the shared product data repository, so that the results of the search query may be communicated directly to the user.

10. The system of claim 1, wherein the static product data for at least one of the one or more products stored in the shared product data repository changes relatively infrequently and the dynamic product data for at least one of the one or more products stored in the one or more seller databases changes relatively frequently.

11. A method for facilitating an electronic commerce transaction, comprising:
accessing by a plurality of users a global content directory server providing a global content directory of products available from one or more sellers, the global content directory server comprising:
a storage medium stored therein a directory structure including a plurality of product classes organized in a hierarchy, each product class categorizing a plurality of products and associated with one or more attributes of the products categorized in the product class, one or more of the product classes having one or more associated pointers that identify a shared product data repository in which static product data for at least one of the one or more products stored in the shared product data repository associated with the product class is stored, the static product data associated with dynamic product data for at least one of the one or more products stored in the one or more seller databases each associated with one or more sellers, the static product data and associated dynamic product data identifying products available from the one or more sellers, the static product data and associated dynamic product data comprising values of attributes of the one or more available products, the global content directory server comprising at least a portion of contents of the shared product data repository and the one or more seller databases; and
a server search interface communicating a search query to the shared product data repository for static product data and initiating a search of one or more seller databases for dynamic product data that is associated with the static product data;
receiving at the global content directory server a selection of a product class from one of the plurality of users, the product class having a pointer identifying the shared product data repository and in response to the selection of the product class by the user, the global content directory server initiating a search, the server search interface:
communicating a search query to the shared product data repository to search static product data for at least one of the one or more products stored in the shared product data repository; and
for static product data matching the search criteria, communicating a search query to one or more seller databases to search dynamic product data for at least one of the one or more products stored in the one or more seller databases that is associated with the static product data for at least one of the one or more products stored in the shared product data repository matching the search criteria; and
communicating the product search results to the user.

12. The method of claim 11, wherein at least one of the one or more pointers identify particular product data in the shared product data repository.

13. The method of claim 11, wherein at least one product class includes one or more first pointers that identify static product data for at least one of the one or more products stored in the shared product data repository and one or more second pointers that identify one or more seller databases having dynamic product data for at least one of the one or more products stored in the one or more seller databases that is associated with the identified static product data.

14. The method of claim 11, wherein communicating a search query comprises communicating a first search query to the shared product data repository to search static product data for at least one of the one or more products stored in the shared product data repository and communicating a second search query to one or more seller databases to search dynamic product data for at least one of the one or more products stored in the one or more seller databases.

15. The method of claim 11, wherein the search query comprises desired values, specified by the user, for one or more of the product attributes associated with the selected product class.

16. The method of claim 11, further comprising:
receiving search results from the shared product data repository and one or more seller databases in response to the search query, the search results including static product data for at least one of the one or more products stored in the shared product data repository and dynamic product data for at least one of the one or more products stored in the one or more seller databases associated with one or more products satisfying the search query; and communicating the search results to the user.

17. The method of claim 16, further comprising:
receiving a selection from the user of a product for which product data is included in the search results; and
communicating address information associated with a seller database that includes product data for the selected product, the address information enabling the user to communicate with a seller associated with the seller database to conduct a commerce transaction relating to the selected product.

18. The method of claim 11, further comprising communicating the location of the user to the shared product data repository, so that the results of the search query may be communicated directly to the user.

19. The method of claim 11, wherein the static product data for at least one of the one or more products stored in the shared product data repository changes relatively infrequently and the dynamic product data for at least one of the one or more products stored in the one or more seller databases changes relatively frequently.

20. Software for facilitating an electronic commerce transaction, the software embodied in a computer-readable storage medium which, when executed by a computer, causes the computer to perform:
accessing by a plurality of users a global content directory server providing a global content directory of products available from one or more sellers, the global content directory server comprising:
a storage medium stored therein a directory structure including a plurality of product classes organized in a hierarchy, each product class categorizing a plurality of products and associated with one or more attributes of the products categorized in the product class, one or more of the product classes having one or more associated pointers that identify a shared product data repository in which static product data for at least one of the one or more products stored in the shared product data repository associated with the product class is stored, the static product data associated with dynamic product data for at least one of the one or more products stored in the one or more seller databases each associated with one or more sellers, the static product data and associated dynamic product data identifying products available from the one or more sellers, the static product data and associated dynamic product data comprising values of attributes of the one or more available products, the global content directory server comprising at least a portion of contents of the shared product data repository and the one or more seller databases; and
a server search interface communicating a search query to the shared product data repository for static product data and initiating a search of one or more seller databases for dynamic product data that is associated with the static product data;
receiving at the global content directory server a selection of a product class from one of the plurality of users, the product class having a pointer identifying the shared product data repository and in response to the selection of the product class by the user, the global content directory server initiating a search, the server search interface:
communicating a search query to the shared product data repository to search static product data for at least one of the one or more products stored in the shared product data repository; and
for static product data matching the search criteria, communicating a search query to one or more seller databases to search dynamic product data for at least one of the one or more products stored in the one or more seller databases that is associated with the static product data for at least one of the one or more products stored in the shared product data repository matching the search criteria; and communicating the product search results to the user.

21. The software of claim 20, wherein one or more of the pointers identify static product data for at least one of the one or more products stored in the shared product data repository.

22. The software of claim 20, wherein at least one product class includes one or more first pointers that identify static product data for at least one of the one or more products stored in the shared product data repository and one or more second pointers that identify one or more seller databases having dynamic product data for at least one of the one or more products stored in the one or more seller databases that is associated with the identified static product data.

23. The software of claim 20, wherein communicating a search query comprises communicating a first search query to the shared product data repository to search static product data for at least one of the one or more products stored in the shared product data repository and communicating a second search query to one or more seller databases to search dynamic product data for at least one of the one or more products stored in the one or more seller databases.

24. The software of claim 20, wherein the search query comprises desired values, specified by the user, for one or more of the product attributes associated with the selected product class.

25. The software of claim 20, further:
receives search results from the shared product data repository and one or more seller databases in response to the search query, the search results including static product data for at least one of the one or more products stored in the shared product data repository and dynamic product data for at least one of the one or more products stored in the one or more seller databases associated with one or more products satisfying the search query; and
communicates the search results to the user.

26. The software of claim 25, further:
receives a selection from the user of a product for which product data is included in the search results; and
communicates address information associated with a seller database that includes product data for the selected product, the address information enabling the user to communicate with a seller associated with the seller database to conduct a commerce transaction relating to the selected product.

27. The software of claim 20, further communicates the location of the user to the shared product data repository, so that the results of the search query may be communicated directly to the user.

28. The software of claim 20, wherein the static product data for at least one of the one or more products stored in the shared product data repository changes relatively infrequently and the dynamic product data for at least one of the one or more products stored in the one or more seller databases changes relatively frequently.

29. A system for facilitating an electronic commerce transaction, comprising:
means for providing a plurality of users access to a global content directory server providing a global content directory of products available from one or more sellers, the global content directory server comprising:

a storage medium stored therein a directory structure including a plurality of product classes organized in a hierarchy, each product class categorizing a plurality of products and associated with one or more attributes of the products categorized in the product class, one or more of the product classes having one or more associated pointers that identify a shared product data repository in which static product data for at least one of the one or more products stored in the shared product data repository associated with the product class is stored, the static product data associated with dynamic product data for at least one of the one or more products stored in the one or more seller databases each associated with one or more sellers, the static product data and associated dynamic product data identifying products available from the one or more sellers, the static product data and associated dynamic product data comprising values of attributes of the one or more available products, the global content directory comprising at least a portion of contents of the shared product data repository and the one or more seller databases; and a server search interface communicating a search query to the shared product data repository for static product data and initiating a search of one or more seller databases for dynamic product data that is associated with the static product data;

means for receiving at the global content directory server a selection of a product class from one of the plurality of users, the product class having a pointer identifying the shared product data repository;

means for communicating, in response to the selection of the product class by the user, a search query to the shared product data repository to search static product data for at least one of the one or more products stored in the shared product data repository; and for static product data matching the search criteria, means for communicating a search query to one or more seller databases to search dynamic product data for at least one of the one or more products stored in the one or more seller databases that is associated with the static product data matching the search criteria; and means for communicating the product search results to the user.

30. An electronic commerce system, comprising:

a storage medium stored therein a shared product data repository including static product data for at least one of the one or more products stored in the shared product data repository, the static product data associated with dynamic product data for at least one of the one or more products stored in the one or more seller databases each associated with one or more sellers, the static product data and associated dynamic product data identifying products available from the one or more sellers, the static product data and associated dynamic product data comprising values of attributes of the one or more available products;

a global content directory server providing a global content directory of products available from the one or more sellers to a plurality of user client computers in communication over a network, the global content directory server comprising:

a storage medium stored therein a directory structure including a plurality of product classes organized in a hierarchy, each product class categorizing a plurality of products and associated with one or more attributes of the products categorized in the product class, at least one product class including one or more first pointers that identify particular static product data for at least one of the one or more products stored in the shared product data repository and one or more second pointers that identify the one or more seller databases having dynamic product data for at least one of the one or more products stored in the one or more seller databases that is associated with the identified static product data;

a server search interface to communicate a search query to the shared product data repository to initiate a search of static product data for at least one of the one or more products stored in the shared product data repository identified by one of the pointers, for one or more of the product attributes associated with the selected product class; and for static product data matching the search criteria, communicate a search query to one or more seller databases to search dynamic product data for at least one of the one or more products stored in the one or more seller databases that is associated with the static product data matching the search criteria; and wherein the product search results are communicated to the user.

31. A method for facilitating an electronic commerce transaction, comprising:

accessing by a plurality of users a global content directory server providing a global content directory of products available from one or more sellers, the global content directory server comprising:

a storage medium stored therein a directory structure including a plurality of product classes organized in a hierarchy, each product class categorizing a plurality of products and associated with one or more attributes of the products categorized in the product class, at least one product class including one or more first pointers that identify particular static product data for at least one of the one or more products stored in the shared product data repository and one or more second pointers that identify one or more seller databases having dynamic product data for at least one of the one or more products stored in the one or more seller databases that is associated with the identified static product data; and a server search interface communicating a search query to the shared product data repository to initiate a search of static product data for at least one of the one or more products stored in the shared product data repository identified by one of the pointers, and initiating a search of one or more seller databases for dynamic product data that is associated with the static product data; and receiving at the global content directory server a selection of a product class from one of the plurality of users, the product class having a pointer identifying the shared product data repository and in response to the selection of the product class by the user, the global content directory server initiating a search, the server search interface:

communicating a search query to the shared product data repository to search static product data for at least one of the one or more products stored in the shared product data repository; and for static product data matching the search criteria, communicate a search query to one or more seller databases to search dynamic product data for at least one of the one or more products stored in the one or more seller databases that is associated with the static product data matching the search criteria; and communicating the product search results to the user.

32. Software for facilitating an electronic commerce transaction, the software embodied in a computer-readable storage medium which, when executed by a computer, causes the computer to perform:

accessing by a plurality of users a global content directory server providing a global content directory of products available from one or more sellers, the global content directory server comprising:

a storage medium stored therein a directory structure including a plurality of product classes organized in a hierarchy, each product class categorizing a plurality of products and associated with one or more attributes of the products categorized in the product class, at least one product class including one or more first pointers that identify particular static product data for at least one of the one or more products stored in the shared product data repository and one or more second pointers that identify one or more seller databases having dynamic product data for at least one of the one or more products stored in the one or more seller databases that is associated with the identified static product data, each seller database being associated with one or more sellers, the static product data and associated dynamic product data identifying products available from the one or more sellers, the static product data for at least one of the one or more products stored in the shared product data repository and associated dynamic product for at least one of the one or more products stored in the one or more seller databases data comprising values of attributes of the one or more available products, the global content directory server comprising at least a portion of contents of the shared product data repository and the one or more seller databases;

a server search interface communicating a search query to the shared product data repository to initiate a search of static product data stored in the shared product data repository identified by one of the pointers, and initiating a search of one or more seller databases for dynamic product data that is associated with the static product data; and receiving at the global content directory server a selection of a product class from one of the plurality of users, the product class having a pointer identifying the shared product data repository and in response to the selection of the product class by the user, the global content directory server initiating a search, the server search interface:

communicating a search query to the shared product data repository to search static product data for at least one of the one or more products stored in the shared product data repository; and for static product data matching the search criteria, communicating a search query to a seller database to search dynamic product data that is associated with the static product data matching the search criteria; and communicating the product search results to the user.

* * * * *